Jan. 1, 1963  C. M. ALSYS  3,070,835
PUMP QUENCHING OF POLYMER SOLVENT MIXTURES
Filed Jan. 12, 1960  2 Sheets-Sheet 1
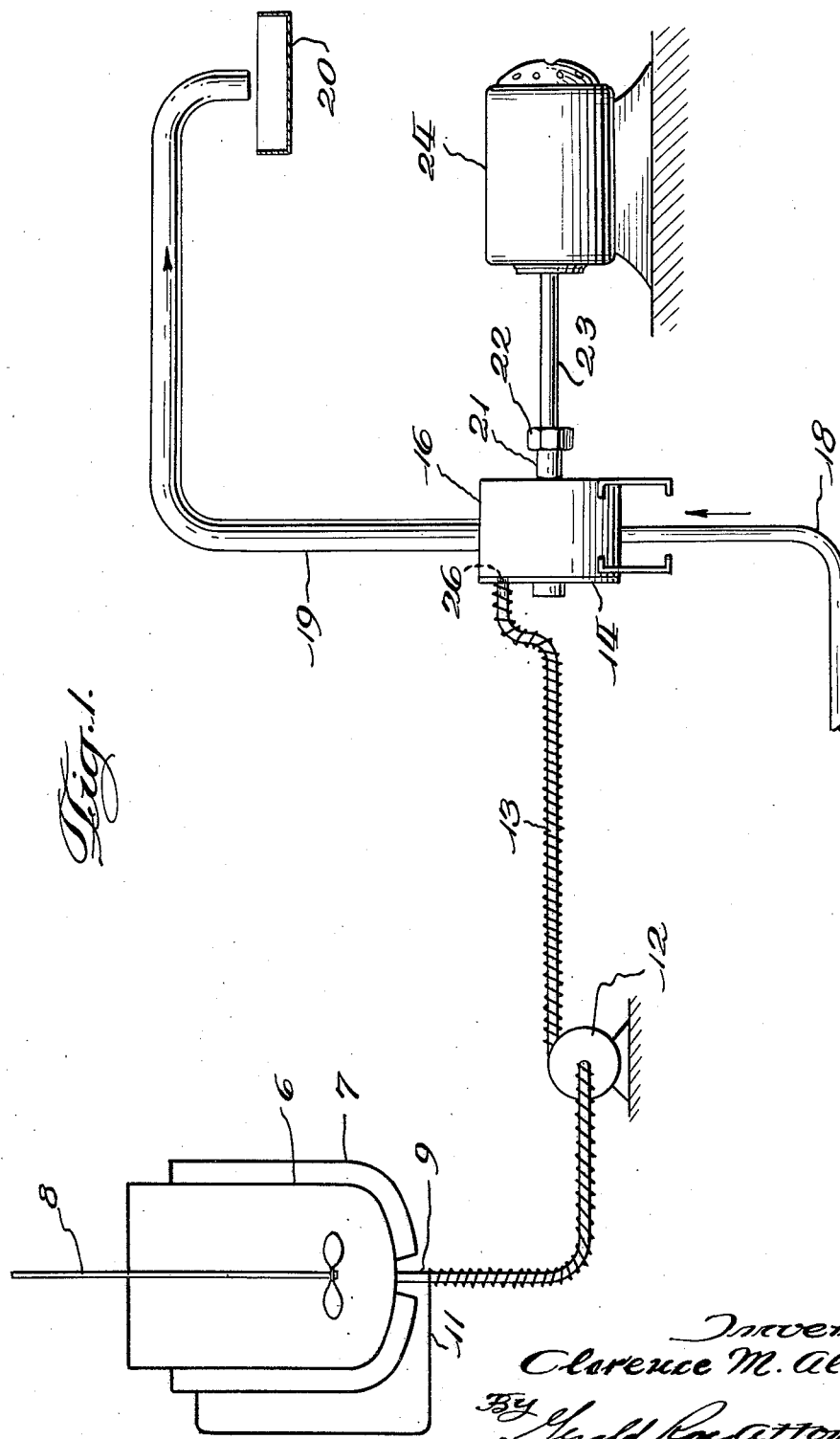
Inventor
Clarence M. Alsys
By Gerald Row Attorney

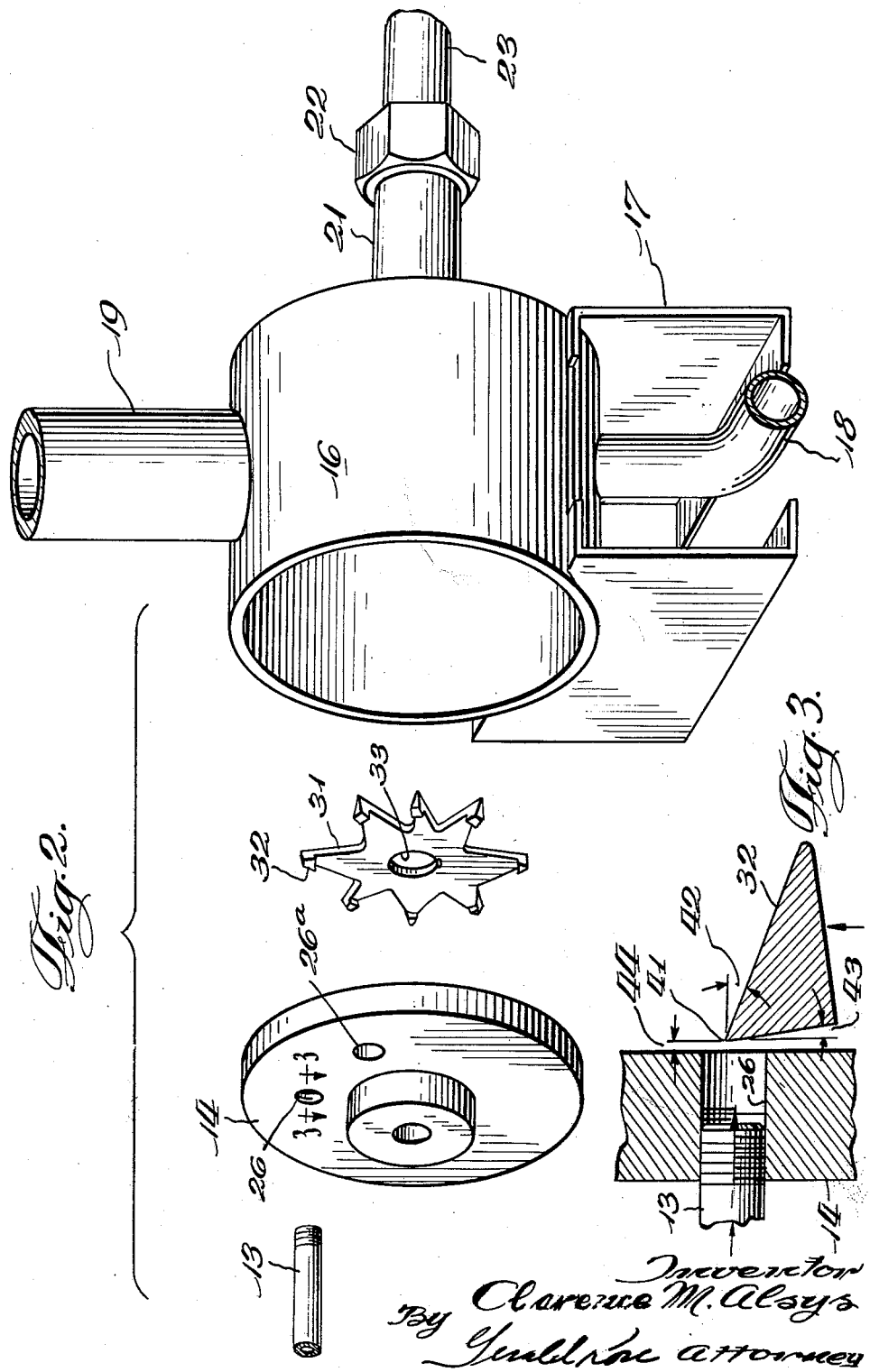

United States Patent Office 3,070,835
Patented Jan. 1, 1963

3,070,835
PUMP QUENCHING OF POLYMER SOLVENT MIXTURES
Clarence M. Alsys, Park Forest, Ill., assignor to Standard Oil Company, Chicago, Ill., a corporation of Indiana
Filed Jan. 12, 1960, Ser. No. 1,986
5 Claims. (Cl. 18—1)

This invention relates to the handling and processing of normally solid olefin polymers. Particularly, the invention provides an improved method for quenching an originally molten mixture of normally solid olefin polymer and normally liquid hydrocarbon solvent before further processing to recover a purified polymer. In a special aspect, the invention provides a means for forming the originally molten mixture into particle-form segments.

In recent years several processes have been developed for polymerized normally gaseous terminal vinyl olefin monomers such as ethylene or propylene to obtain tough resinous solid polymers. These new processes generally involve the catalytic polymerization of an appropriate olefin in the presence of suitable polymerization catalysts and of a substantially inert liquid hydrocarbon reaction medium. Polymerization reactions are frequently conducted at a sufficiently high temperature to produce the polymer as a homogeneous solution in the reaction mixture, and accordingly at the termination of a reaction the reaction mixture consists of polymer, liquid hydrocarbon reaction medium or solvent, excess unreacted olefin, and catalyst.

These reaction mixtures are particularly difficult to handle and process. Subsequent processing however is essential for the removal of excess olefin, solvent, and catalyst, and for the recovery of purified solid olefin polymer product. It is with the handling of molten polymer-reaction medium mixtures, whether or not containing unreacted olefin and catalyst, that the present invention applies.

These mixtures, as indicated previously, are quite troublesome to handle. For one thing, they are exceedingly viscous and tacky, and accordingly possess low heat transfer coefficients in addition to adhering to virtually all surfaces. Furthermore, the composition of such mixtures or "melts" as they are commonly termed, may vary widely depending upon previous processing. Accordingly, it is a primary object of the present invention to provide a step in the recovery of normally solid olefin polymers from the molten polymer-liquid hydrocarbon mixture, whereby the polymer can be subsequently processed and handled without encountering the several problems due to viscosity and tackiness.

Briefly, and in accordance with the invention, the melt comprising normally solid olefin polymer and normally liquid hydrocarbon solvent or reaction medium (together with any unreacted olefin and catalyst if not previously removed) is extruded from an orifice or die directly into a moving body of relatively cool water. Immediately as the extrudate enters the water, it is sheared into segments with a moving blade which is spaced from about 0.005 to about 0.015 inch from the orifice. The segments are then permitted to cool or become "quenched" by direct contact with the moving body of relatively cool water, and thereby solidified into discrete easily-handled segments. Thus the invention is in effect an improved form of pump quenching, where the melt is formed into solidified segments which can be withdrawn as a slurry in the water used for quenching.

It has further been found, in accordance with the invention that the polymer segments can, under certain conditions, be recovered as individual particle-form segments which physically resemble irregular spheres. Such segments may be obtained if the concentration of normally solid olefin polymer in the original melt is in excess of ten plus twice the melt index of polymer, and if the shearing blade has a rake angle from zero to about 45 degrees, preferably from about 10 to about 40 degrees. Shearing, as distinguished from cutting with a razor-like blade, avoids forming hair-like strands on the quenched segments.

The term "melt index" as employed throughout the specification and claims, is a measure of molecular weight and, to some extent, chain branching, of solid olefin polymers. The method by which melt index is determined is described in American Society for Testing Materials D1238–52T, and further described in Modern Plastics, 31 (2), 146, 148, 150, 229 (1953). In brief, melt index is the number of grams of polymer flowing through a standard orifice in a given time at a standard temperature and pressure; a melt index of one corresponds to a melt viscosity of $10^6$ poises.

The invention will be more clearly understood, and various embodiments thereof will be described in more detail, in the ensuing description when read in conjunction with the attached drawings wherein:

FIGURE 1 shows, in schematic form, a system for pump quenching a polymer-hydrocarbon melt according to the invention;

FIGURE 2 is an exploded view of a pump quencher according to the invention; and

FIGURE 3 is a detailed view, partly in section, showing the spacing and position of a moving blade with respect to an extrusion orifice.

Normally solid olefin polymers which may be handled according to the present invention are the homopolymers and copolymers of normally gaseous terminal vinyl olefin monomers, either alone or with suitable comonomers. Suitable terminal vinyl olefin monomers include ethylene, propylene, 1-butene, and 1-pentene, and their admixtures with each other. Such olefin monomers may also be copolymerized to elastomeric solid polymers by polymerizing them with a small amount, generally from about 0.5 weight percent to about 25 weight percent, of a conjugated diene hydrocarbon such as butadiene, isoprene, piperylene, cyclopentadiene or the like. All of these solid olefin polymers, whether amorphous or crystalline, have specific gravities or densities (24/4° C.) of less than 1.0, and accordingly will float in water. With the addition of a solvent hydrocarbon, the density is even less than 1.0.

Polymerization of the selected olefin monomer or mixture of olefin monomers may be effected in the presence of a catalyst which comprises or consists of a transition metal element or compound, such as those found in groups IV, V, VI and VIII of the Mendeleef periodic table, examples of which are discussed in the article by Friedlander and Resnick in "Advances in Petroleum Chemistry and Refining," volume I, chapter 11, pages 527–570. Illustratively, polymerization catalysts include nickel metal on charcoal, partially reduced molybdenum oxide or chromium oxide extended on a difficultly reducible metal oxide such as silica or alumina, vanadia promoted by sodium metal, titanium tetrachloride promoted by aluminum triethyl, and titanium trichloride promoted with aluminum triethyl.

The inert hydrocarbon solvent or reaction medium which is employed in effecting the polymerization may be any hydrocarbon which is liquid at 20° C. and which is sufficiently inert under polymerization conditions as not to deleteriously effect the polymerization or significantly contaminate the resultant polymer. Examples of suitable hydrocarbon reaction media include saturated hydrocarbons (alkanes and cycloalkanes) such as mineral spirits (acid treated petroleum fraction having a boiling range of about 168–190° C.) or $C_{10}$–$C_{12}$ paraffins, unreactive alkenes, e.g. octenes, nonenes, hexadecenes, cyclohexene, etc., or aromatic hydrocarbons such as benzene, toluene, etc. A detailed listing of suitable solvents is set forth in Field et al. U.S. Patent 2,691,647. The concentration of olefin in the solvent or reaction medium can be varied from about 2% to about 50% or more by weight.

The composition of molten normally solid olefin polymer and liquid hydrocarbon reaction medium as it is processed according to the invention depends on upstream processing steps and conditions. Ordinarily, it contains a major amount (50% or more by weight) of normally solid polymer and a minor amount of liquid hydrocarbon reaction medium, although the latter may be present in concentrations ranging from 5% or less to 85% or more. The amount, if any, of unreacted olefin monomer, and the precise amount of liquid hydrocarbon reaction medium which are present in the melt, also depend upon the previous treatment of the melt, e.g. the temperature and pressure at which flashing or equivalent means were employed to remove the bulk of these volatile components. Whether, and in what amount, any catalyst is present depends upon the concentration of catalyst in the polymerization reaction mixture, and on any processing such as filtration or electrostatic precipitation used to effect catalyst removal. Thus it will be apparent that the invention is of extremely broad applicability.

When it is desired to produce particle-form segements of quenched and extruded polymer, it is necessary that the concentration of polymer in the melt be in excess of ten plus twice the melt index of the polymer alone; this correlation has been confirmed over a range of melt indices of from one to ten.

The temperatures at which the melt is obtained and processed may vary widely, provided only that the melt is in an extrudable condition. Pure crystalline polyethylene has a melting range of about 130–137° C. (when crystallinity suddenly disappears in a sample placed between crossed Nicol prisms on a hot stage microscope), and crystalline polypropylene melts at about 160–170° C. Copolymers melt at intermediate, or even lower temperatures, and the mixture of normally solid olefin polymer and normally liquid hydrocarbon solvent may melt at temperatures as low as 100° C., and occasionally even as low as 90° C. or lower.

Referring now to FIGURE 1 showing the operation of the inventive system depicted in schematic form, a melt of normally solid olefin polymer such as a high density polyethylene (density of 0.96 to about 0.98 20/4) and mineral spirits, having a composition of approximately 20 weight percent polymer and wherein the polymer has a melt index of about four, is contained within vessel 6. This vessel is provided with a stirrer 8 and with a steam jacket 7 to maintain the melt in fluid form. The melt is withdrawn from vessel 6 via line 9, which is jacketed with steam trays line 11, and conducted to polymer feed pump 12, which may be a screw type extruder pump or may be a positive displacement pump of the "moyno" or gear types. From pump 12 the polymer is conducted through steam traced line 13 to extrusion die 14 which constitutes a lateral face of pump quencher 16. The details of pump quencher 16 will be described presently in conjunction with FIGURE 2. For the momement however it suffices to say that pump quencher 16 is supported on base 17 and is provided with a flowing stream or body of water via inlet conduit 18, which exhausts as a slurry of granular or segmented polyethylene in water via line 19 to screen 20, where the bulk of water is withdrawn. Motor 24 provides power to pump quencher 16 via shaft 23, packing gland 21, and packing gland follower nut 22. The position of motor 24 with respect to pump quencher base 17 is preferably made adjustable so as to permit regulation of the impeller of quencher 16 with respect to extrusion die 14. If desired, pump quencher 16 may be jacketed by means of steam or other heating medium in a jacket or trays, not shown.

Referring now to FIGURE 2, an exploded schematic view of pump quencher 16 is shown. It is seen that extrusion die 14 is provided with one or more extrusion orifice 26 and 26a which are so spaced at a distance from the axis so as to permit the extrudate to be sheared or chopped by blades 32 of impeller 31. Impeller 31 may be provided with one or more such blades 32 and desirably has a plurality of such blades, preferably in multiples of four. Impeller 31 is adapted for mounting onto a shaft 23, not shown in this figure, by means of slotted hole 33.

It has been found that an important requirement for successful operation of the present invention is that the spacing of an impeller 31 with respect to orifices 26 be rigidly controlled between about 0.005 inch to about 0.015 inch. If the spacing is less, then the flat portion of blades 32 may temporarily block orifices 26 and 26a and create an excessive back pressure in the polymer feed pump. On the other hand, if the spacing between orifices 26 and blades 32 exceeds about 0.015 inch, then extrudate will not be clearly sheared, and instead will have a long filament-like tail at the end of the polymer segment, resembling somewhat the appearance of a polliwog. This tail renders the segment considerably more difficult to handle in subsequent operations.

Further in connection with FIGURE 2, the pump quencher includes a chamber 16 which contains the moving body of water admitted through conduit 18 and withdrawn through conduit 19. A packing gland or stuffing box 21 together with a follower nut 22 permits the rotation and necessary axial adjustment of a shaft connecting to a motor (shaft 23 and motor 24 of FIGURE 1).

FIGURE 3 illustrates an enlarged top sectional view showing the relationship between extrusion die 14 and blades 32 of impeller 31. Extrusion die 14 is equipped with one or more orifices 26, through which the melt, at a high pressure, e.g. 1000 p.s.i.g. and at high temperature, e.g. 100–500° F., is admitted. Orifices 26 may be of any suitable size and shape, for example 5/16 diameter. The melt is extruded via orifice 26 into the body of water in the pump quencher.

Blades 32 are located at the extremities of impeller 31. The spacing 44 between die 14 and blade 32 is between about 0.005 inch to about 0.015 inch, for reasons given above. The true rake angle 42, which is the angle between a normal to extrusion die 14 and the leading face of blade 32, is between zero and 45 degrees, preferably between 10 and 40 degrees. The preferred angle affords the additional advantage of hurling polymer segments into the body of water and away from the extrusion orifices 26. Leading edge 41 of blade 32 is preferably sharpened, and may be made of a hardened steel such as Stellite. Working relief angle 43 may be from zero to about 30 degrees; its value is not critical.

Returning momentarily to FIGURE 1, after leaving pump quencher 16 the slurry of polymer segments in water is passed via line 19 to screen 20. The water separates clearly away from the quenched polymer segments, and the resultant segments may contain as little as 1% water. If it is desired to steam strip the segments at atmospheric pressure or below so as to remove contained hydrocarbon solvent, separation of water from the segments is unnecessary, and the entire slurry may be transferred to a suitable steam still. Steam distilling of segments produced by the instant process is an exceptionally facile method of purifying the polymer for use; four hours stripping under 300 millimeters mercury vacuum reduced hydrocarbon content to an indetectably low amount.

EXAMPLES

To demonstrate the operation and advantages of the instant process, a series of runs was conducted using polymers of varying densities, ranging from 0.9 density to Fawcett-type polyethylene to a high density 0.98 low pressure polyethylene. The polymer was in solution in varying concentrations in a mineral spirits solvent. The pump quencher impeller had eight cutting edges rotating at a motor speed of 1725 r.p.m., giving a peripheral speed of the cutter blade at the center of the polymer inlet die of 38.6 feet per second; each blade was 2⅞" long. The center of the polymer die inlet was located at a distance of 2 9/16" from the center of the impeller. Thus the distance between cutter blades at this radius was 1.75", allowing polymer to flow for $3.78 \times 10^{-3}$ seconds between cuts. An 0.5 horsepower motor sufficed for two extrusion orifices. Conditions are summarized in the table below:

Table I

| | |
|---|---|
| Body diameter | 6" |
| Impeller diameter at polymer inlets | 5.125" |
| Number of polymer inlets | 2 |
| Number of cutting blades | 8 |
| Width of blades at polymer inlet | 5/16" |
| Distance between blades | 1.75" |
| Impeller speed (r.p.m.) | 1,725 |
| Peripheral speed at the polymer inlet (in./sec.) | 463 |
| Polymer flow time ($10^{-3}$ sec.) | 3.78 |
| Polymer flow rate (ft./sec.) | 3.1 |
| Polymer orifice dimensions (D x L inches) | 5/16" x ¾" |
| Water inlet pipe diameter (in.) | 1 |
| Water outlet pipe diameter | 2 |
| Power requirements (H.P.) | 0.5 |
| Particle shape (for high density PE) | Rice |
| Production rate (100% polyethylene #/hr.) | 120 |
| (average) (20% polyethylene #/hr.) | 600 |

Using the above arrangement, a series of runs was conducted. The particles obtained from each run are described with reference to their physical similarity to seeds of various types. Thus, rice particles resemble rice in size and shape, while "cole slaw" refers to stringly polymer which can be steam stripped but which is less preferred than seed-shaped segments. The following results were observed, and it is particularly noted that when the polymer concentration was less than ten plus twice the melt index then a cole slaw type segment was obtained. "Pumpkin seed" segments were obtained at a concentration of about ten plus twice the melt index, while higher concentrations gave smaller and denser segments.

duction when the polymer has a melt index below about four. Further, feed rate may vary widely, from 92 to well over 400 pounds per hour through each orifice.

The solidified segments may be further processed for the recovery and purification of solid olefin polymer. For example, they may be drained and then dried by means of heated air or inert gas; they may be steam distilled to remove liquid hydrocarbon reaction medium as described previously, followed by inert gas drying; they may be dried and extracted with a paraffinic hydrocarbon having from 3 to about 7 carbon atoms per molecule to displace the less volatile mineral spirits solvents and then dried by vacuum extrusion for similar mechanical expression technique, etc.

Various alternatives, modifications and embodiments of the present invention are of course possible. These will occur to those skilled in the art in view of the foregoing exemplary description, and it is intended to include within the scope of the appended claims all such alternatives, modifications, and embodiments as will fall within the spirit and broad scope of the invention.

I claim:
1. The method of producing particle-form segments by pump quenching a solution of a normally solid olefin polymer and a normally liquid hydrocarbon solvent, wherein the weight percent concentration of said polymer in the solution is in excess of ten plus twice the melt index of said polymer, which method comprises extruding said solution through an orifice into a moving body of relatively cool water, shearing the extrudate into particle-form segments with a moving blade spaced from about 0.005 to about 0.015 inch from said orifice and having a rake angle of zero to about 45 degrees, and withdrawing said particle-form segments as a slurry in said moving body of water.

2. Method of claim 1 wherein said moving blade is a rotatable blade.

3. Method of claim 1 wherein a plurality of orifices is employed and the extrudates from each of said orifices are sheared with a plurality of rotatable blades.

4. Method of claim 1 wherein said moving blades are adjustably spaceable from said orifices.

5. Apparatus for pump quenching a solution of a normally solid olefin polymer and a normally liquid hydrocarbon solvent wherein the weight percent concentration of said polymer in the solution is in excess of ten plus twice the melt index of said polymer, which apparatus comprises a chamber containing a moving body of relatively cool water, an orifice for extruding said solu- Table II

| Run No. | Polymer solids, weight percent | Melt index | Polymer density, D/4 | Feed temp., °F. | Feed rate, lbs/hr. | No. of inlets | Particle description |
|---|---|---|---|---|---|---|---|
| 1 | 6 | 1 | 0.97 | 220 | 300 | 2 | Cole Slaw. |
| 2 | 12 | 1 | 0.97 | 220 | 300 | 2 | Pumpkin Seed. |
| 3 | 20 | 1 | 0.98 | 305 | 92 | 1 | Pea Bean. |
| 4 | 20 | 1 | 0.98 | 305 | 180 | 2 | Rice. |
| 5 | 20 | 5 | 0.92 | 140 | 600 | 2 | Cole Slaw. |
| 6 | 20 | 5 | 0.97 | 304 | 600 | 2 | Pumpkin Seed. |
| 7 | 20 | 5 | 0.97 | 304 | 936 | 2 | Do. |
| 8 | 22 | 4.9 | 0.96 | 240 | 600 | 2 | Lima Bean. |
| 9 | 25 | 5 | 0.92 | 240 | 600 | 2 | Pea Bean. |
| 10 | 25 | 5 | 0.92 | 185 | 600 | 2 | Do. |
| 11 | 40 | 5 | 0.92 | 200 | 600 | 2 | Pumpkin Seed. |
| 12 | 20 | 10 | 0.96 | 232 | 432 | 1 | Cole Slaw to Pumpkin Seeds. |
| 13 | 20 | 10 | 0.96 | 200 | 432 | 1 | |
| 14 | 20 | 10 | 0.96 | 180 | 432 | 1 | |

It is particularly noted that temperature at the extrusion orifice inlet is not a material variable, and may range from just above 100° to over 300° without exerting a major effect on segment shape; higher temperatures exhibit a slight tendency towards favoring cole slaw protion of polymer and solvent into said chamber, a rotatable blade for shearing the extrudate into particle-form segments, said blade being spaced from about 0.005 to about 0.015 inch from said orifice and having a rake angle of zero to about 45 degrees, and a conduit communicating from said chamber for withdrawing said segments as a slurry in said moving body of water.

References Cited in the file of this patent

UNITED STATES PATENTS

| | | |
|---|---|---|
| 2,021,837 | Davidson | Nov. 19, 1935 |
| 2,422,480 | Gordon | June 17, 1947 |
| 2,524,751 | Berger | Oct. 10, 1950 |
| 2,576,977 | Stober | Dec. 4, 1951 |
| 2,614,290 | Street | Oct. 21, 1952 |
| 2,850,764 | Evans et al. | Sept. 9, 1958 |
| 2,862,243 | Farr et al. | Dec. 2, 1958 |
| 2,929,107 | Andrew | Mar. 22, 1960 |

FOREIGN PATENTS

| | | |
|---|---|---|
| 551,677 | Belgium | Apr. 10, 1957 |